(12) United States Patent
Chao et al.

(10) Patent No.: US 8,004,632 B2
(45) Date of Patent: Aug. 23, 2011

(54) FLAT DISPLAY DEVICE

(75) Inventors: Shih-Wei Chao, Taoyuan County (TW); Ying-Ying Chu, Taipei County (TW); Chun-Hung Lin, Taipei County (TW)

(73) Assignee: BenQ Materials Corporation, Gueishan, Tao-Yuan Hsien (TW)

( * ) Notice: Subject to any disclaimer, the term of this patent is extended or adjusted under 35 U.S.C. 154(b) by 431 days.

(21) Appl. No.: 12/250,548

(22) Filed: Oct. 14, 2008

(65) Prior Publication Data

US 2009/0284694 A1 Nov. 19, 2009

(30) Foreign Application Priority Data

May 15, 2008 (TW) ................................ 97117824 A

(51) Int. Cl.
*G02F 1/1335* (2006.01)
(52) U.S. Cl. ........................................................ 349/99
(58) Field of Classification Search ................ 349/99
See application file for complete search history.

(56) References Cited

U.S. PATENT DOCUMENTS

| 6,398,370 | B1 | 6/2002 | Chiu et al. | |
|---|---|---|---|---|
| 6,731,416 | B2 | 5/2004 | Hazzard | |
| 2002/0159011 | A1* | 10/2002 | Ikeno et al. | 349/117 |
| 2007/0171336 | A1* | 7/2007 | Kim et al. | 349/102 |
| 2008/0013022 | A1* | 1/2008 | Ochiai et al. | 349/114 |
| 2008/0100783 | A1* | 5/2008 | Bae | 349/96 |

* cited by examiner

*Primary Examiner* — Michelle R Connelly Cushwa
(74) *Attorney, Agent, or Firm* — Winston Hsu; Scott Margo

(57) ABSTRACT

A flat display device includes a flat display panel, an upper polarizing plate disposed on a light exit plane of the flat display panel, and a lower polarizing plate disposed on a light entrance plane of the flat display panel. The upper polarizing plate includes a wide view film, and its absorption axis and a horizontal view direction of the flat display panel have an included angle of about 15 degrees. The absorption axis of the lower polarizing plate and the horizontal view direction of the flat display panel have an included angle of about 105 degrees.

12 Claims, 10 Drawing Sheets

FLAT DISPLAY DEVICE

BACKGROUND OF THE INVENTION

1. Field of the Invention

The present invention relates to a flat display device, and more particularly, to a flat display device having an anti-peeping function.

2. Description of the Prior Art

Although wide viewing angle technology has been an inexorable trend for enhancing the contrast of liquid a crystal display (LCD), it is often desirable that a viewing angle be restricted in certain applications of LCDs, so that users can only see the image within a particular field of view. For instance, when a user is operating an automated teller machine (ATM), using a laptop computer in public while handling personal documents or handling an industrial computer, under considerations of safety and privacy, a flat display device with a narrow viewing angle or one that can provide an anti-peeping function is required. In this way, a clear view of an image or information would be limited to those users who are looking squarely at the display device, instead of other people standing alongside.

Current viewing angle narrowing technology or anti-peeping technology attaches another film having an anti-peeping function to the surface of the wide viewing angle flat display device. For instance, in U.S. Pat. No. 6,398,370, Chiu, et al. disclose a polymer film having an anti-peeping function. Utilizing the light-blocking physical property of the polymer film enables the users to view the displayed image of the flat display device within a fixed field of view, while others outside the field of view cannot view the displayed image. The shortcomings, however, of using the polymer film are that the additional polymer film of a certain thickness adhered to the surface of the display device is expensive, and thus increases the cost and thickness of the flat display device.

SUMMARY OF THE INVENTION

One objective of the present invention is to provide a flat display device having an anti-peeping function. This objective is achieved by utilizing a polarizing plate with a wide view (WV) film in collocation with a specific absorption axis to obtain the anti-peeping function.

Accordingly, a first embodiment of the present invention is a flat display device including a flat display panel, an upper polarizing plate disposed on a light exit plane of the flat display panel, and a lower polarizing plate disposed on a light entrance plane of the flat display panel. The upper polarizing plate includes a wide view film, and its absorption axis and a horizontal view direction of the flat display panel have an included angle of about 15 degrees. The absorption axis of the lower polarizing plate and the horizontal view direction of the flat display panel have an included angle of about 105 degrees.

The present invention in the second embodiment is a flat display device including a flat display panel, an upper polarizing plate disposed on a light exit plane of the flat display panel, and a lower polarizing plate disposed on a light entrance plane of the flat display panel. The absorption axis of the upper polarizing plate and a horizontal view direction of the flat display panel have an included angle of about 75 degrees. The lower polarizing plate includes a wide view film, and its absorption axis and the horizontal view direction of the flat display panel have an included angle of about 165 degrees.

A wide view film is disposed on the upper polarizing plate or the lower polarizing plate in the flat display device of the present invention, and in collocation with different specific included angles between the absorption axis of the upper polarizing plate or the lower polarizing plate and the horizontal view direction of the flat display panel, enabling a higher contrast ratio when looking squarely at the flat display device. A field of view is determined by the contrast ratio. With a lower contrast ratio, the horizontal view direction is thus limited to a smaller field of view, providing an effective anti-peeping function for users when viewing a flat display device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
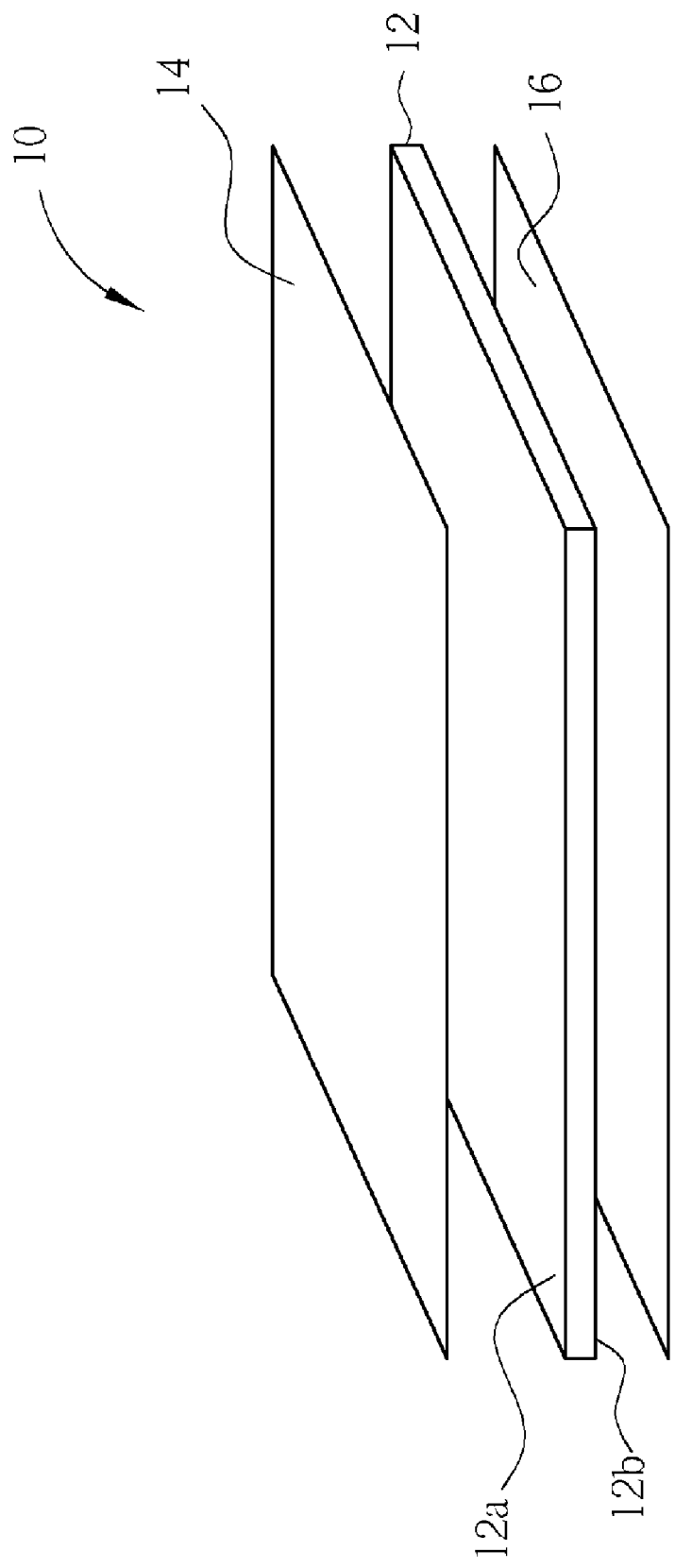
FIG. 1 is a schematic diagram of a flat display device according to a first embodiment of the present invention.

Please refer to FIG. 1. FIG. 1 is a schematic diagram of a flat display device 10 according to a first embodiment of the present invention. The flat display device 10 according to the present invention includes a flat display panel 12, an upper polarizing plate 14 and a lower polarizing plate 16. The flat display panel 12 is an LCD in the preferred embodiment, for instance a twist nematic (TN) LCD, a vertical alignment (VA) LCD, or a multi-domain vertical alignment (MVA) LCD. The flat display panel 12 includes a light exit plane 12a and a light entrance plane 12b. The upper polarizing plate 14 is disposed on the surface of the light exit plane 12a of the flat display panel 12, and the lower polarizing plate 16 is disposed on the surface of the light entrance plane 12b of the flat display panel 12.

Figure 2:
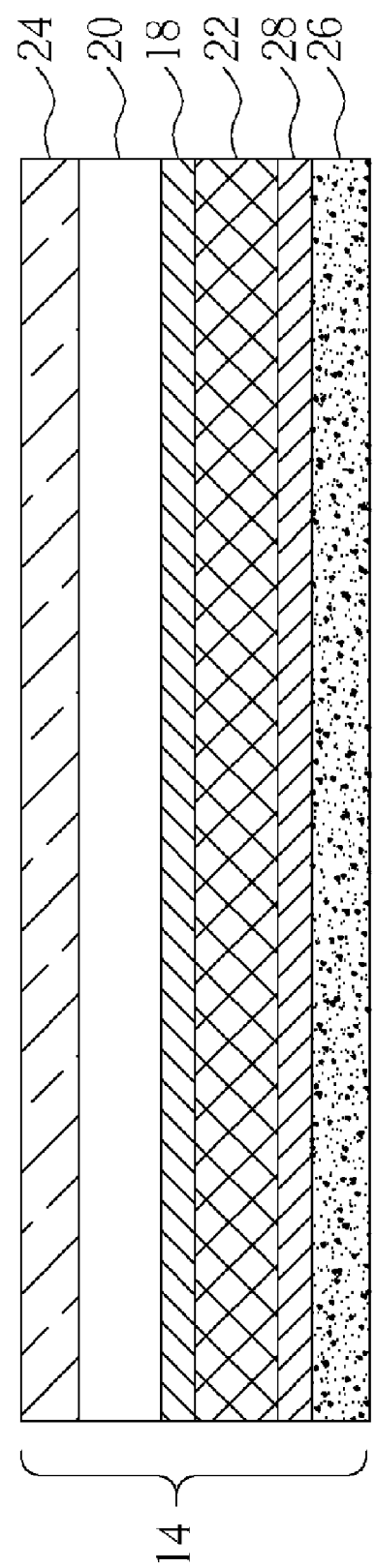
FIG. 2 is a schematic cross-sectional view of the upper polarizing plate as shown in FIG. 1.

Please refer to FIG. 2. FIG. 2 is a schematic cross-sectional view of the upper polarizing plate 14 as shown in FIG. 1. The upper polarizing plate 14 includes at least a polarizer 18 having an Iodine complex-containing polyvinyl alcohol (PVA) film. The transmittance (penetration rate) of the polarizer 18 can be more than 41%, while the polarizing efficiency of the polarizer can be more than 99.9%, with a thickness of 20 to 35 micrometer (μm). In other embodiments, the polarizer 18 can include derivatives of PVA. Two protection layers 20, 22 are each attached to the surface on both sides of polarizer 18 with hydrogel, providing protection of polarizer 18. Protection layers 20, 22 are each triacetyl cellulose (TAC) film. In addition, the protection layer 22 can be a WV TAC film. In a preferred embodiment, the protection layer 22 can be an excellent wide view (EWV) film or a super wide view (SWV) film. Furthermore, the upper polarizing plate 14 can selectively include a protection film 24 adhering to another side of the protection layer 20 opposite to the polarizer 18, and include a release film 26 adhering to another side of the protection layer 22 opposite to the polarizer 18 with pressure-sensitive adhesive (PSA)28.

Figure 3:
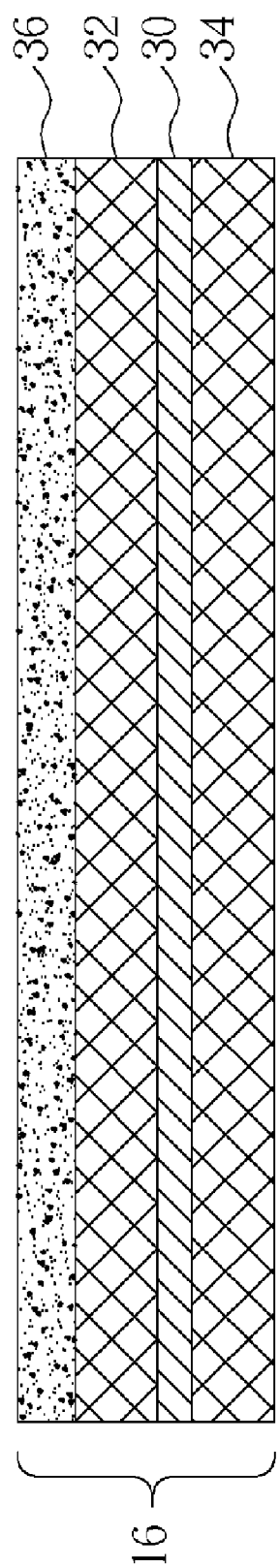
FIG. 3 is a schematic cross-sectional view of the lower polarizing plate as shown in FIG. 1.

FIG. 3 is a schematic cross-sectional view of the lower polarizing plate 16 of FIG. 1. As shown in FIG. 3, the lower polarizing plate 16 includes a polarizer 30 having the same materials as polarizer 18 of the upper polarizing plate 14. Moreover, the lower polarizing plate 16 includes two protection layers 32, 34 which are each attached to the surface on both sides of polarizer 30. Protection layers 32, 34 in a preferred embodiment may be films including TAC without having wide view compensation characteristics such as WV film. In the first embodiment, a brightness enhancement film 36 is disposed on another side of the protection layer 32 opposite to the polarizer 30. Similarly, the lower polarizing plate 16 can further selectively include a protection film, pressure-sensitive adhesive or release film (not shown) adhering to the outer side of the protection layers 32, 34. Moreover, the protection layer 20 of the upper polarizing plate 14 and the protection layer 32 of the lower polarizing plate 16 can selectively include a surface undergoing anti-glare treatment, series anti-glare treatment or hard-coating treatment.

Figure 4:
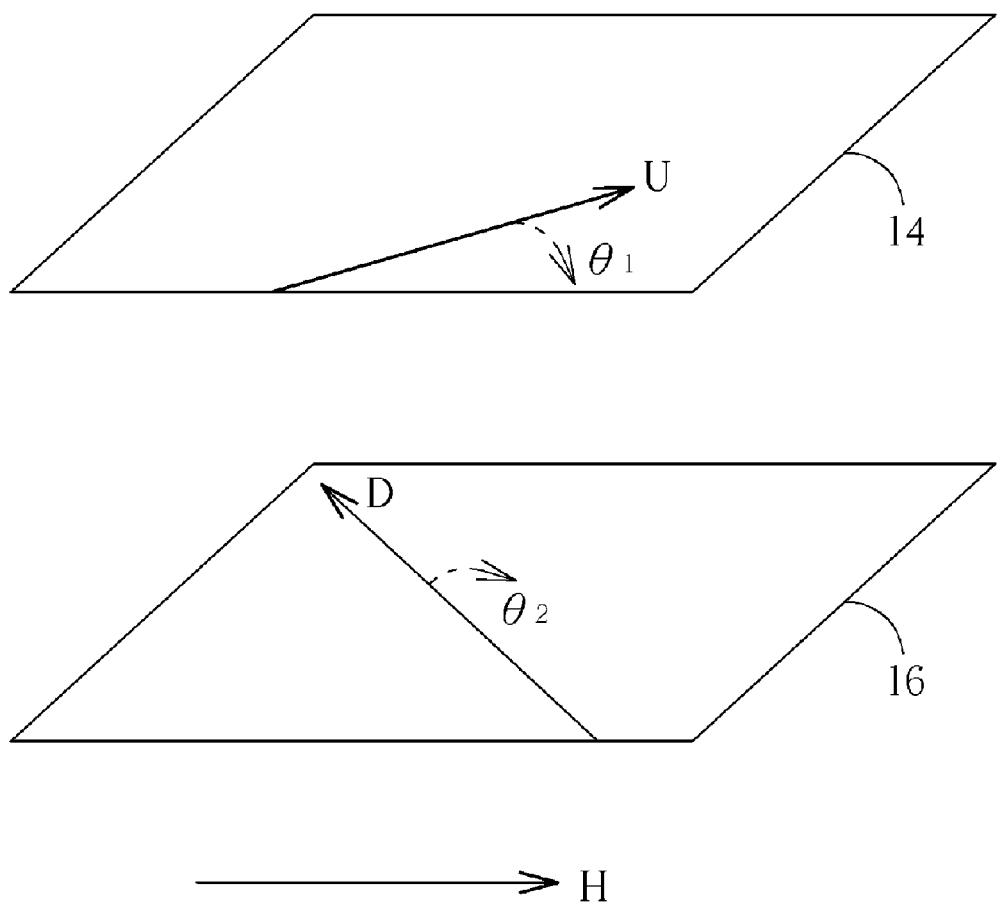
FIG. 4 is a schematic diagram of the relative relation regarding the absorption axes of the upper polarizing plate and the lower polarizing plate.

Please refer to FIG. 4. FIG. 4 is a schematic diagram of the relative relation regarding the absorption axes of the upper polarizing plate 14 and the lower polarizing plate 16. When the upper polarizing plate 14 and the lower polarizing plate 16 are each disposed on the light exit plane 12a and the light entrance plane 12b of the flat display panel 12, the directions of the absorption axes of the upper polarizing plate 14 and the lower polarizing plate 16 are shown as arrow U and arrow D, respectively. Furthermore, an included angle between the direction of the absorption axis U of the upper polarizing plate 14 and the horizontal view direction (shown as H) of the flat display panel 12, is defined as θ1. An included angle between the direction of the absorption axis D of the lower polarizing plate 16 and the horizontal view direction (shown as H) of the flat display panel 12 is defined as θ2. θ1 and θ2 are 15 degrees and 105 degrees, respectively.

Please refer to Table 1. Table 1 is the data table according to absorption axes included angles θ1/θ2 versus certain different view directions. Field of view is defined as contrast ratio (CR) which is larger than 10. As shown in Table 1, when the combination of absorption axis included angles θ1/θ2 of the upper polarizing plate 14 and the lower polarizing plate 16 is 15 degrees/105 degrees, both angles of fields of view in left and right horizontal view directions are efficiently reduced to less than 30 degrees. The central field of view is shifted to the lower vertical viewing angle, while the anti-peeping angle of the upper vertical view direction is reduced to be less than 40 degrees and the angle of the lower vertical view direction is increased to be larger than 80 degrees. Therefore, when the included angles of the absorption axis of the upper polarizing plate 14 and the absorption axis of the lower polarizing plate 16 θ1/θ2 are 15 degrees/105 degrees, respectively, an anti-peeping function is provided in both the left and right view directions and also in the upper view direction, and the field of view when looking squarely at the flat display device 10 and the field of view in the lower vertical view direction are increased without influencing the usage of the user. In addition, both the field of view in the upper view directions at 45 degrees and 135 degrees are narrowed, providing better anti-peeping function in practical use. In contrast with other absorption axes included angles θ1/θ2, there are θ1/θ2 combinations that cannot provide a larger field of view in the lower vertical view direction, for example 45 degrees/135 degrees combination or 0 degree/90 degrees combination, or θ1/θ2 combinations that provide larger field of view in the left and right horizontal view direction which cannot effectively offer an anti-peeping function, for example 30 degrees/120 degrees combination.

TABLE 1

Data table according to absorption axes included angles θ1/θ2 versus certain different view directions.

| | Absorption axis included angles | | | |
|---|---|---|---|---|
| | 45°/135° | 30°/120° | 15°/105° | 0°/90° |
| Right view direction | >80° | 48° | 29° | 27° |
| Left view direction | 50° | 35° | 27° | 26° |
| Upper view direction | 31° | 35° | 39° | 40° |
| Lower view direction | 36° | >80° | >80° | 51° |
| 45° view direction | 41° | 31° | 29° | 37° |
| 135° view direction | >80° | 73° | 36° | 24° |

Figure 5:
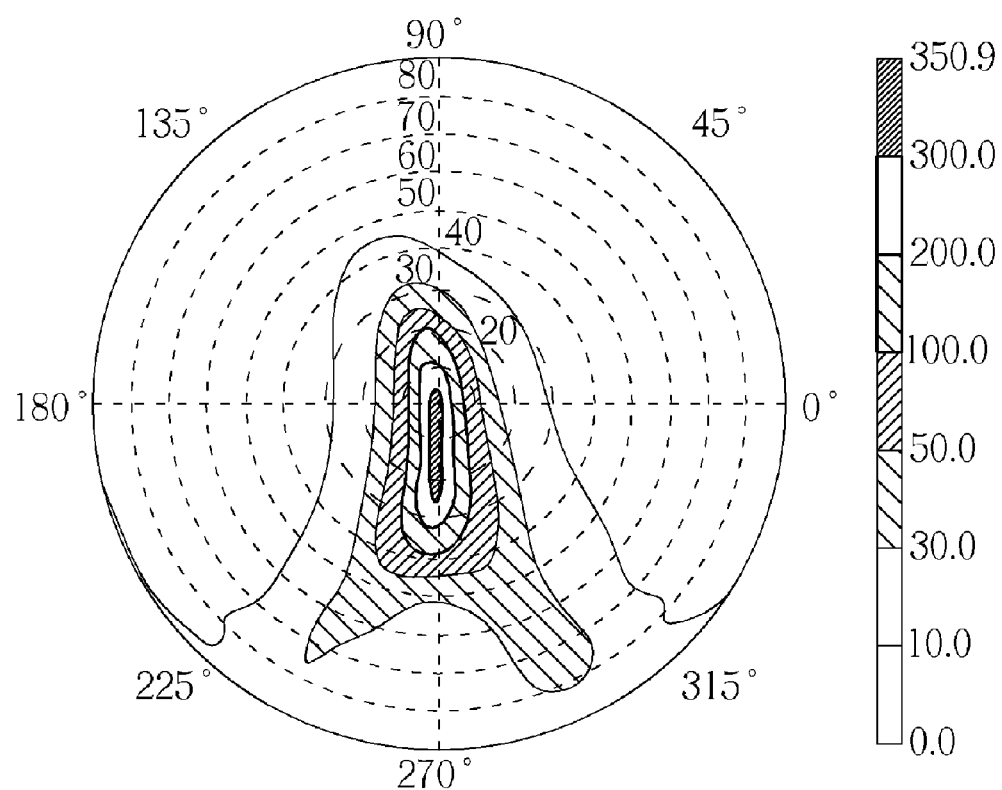
FIG. 5 is a contrast ratio contour of the flat display device as shown in FIG. 1.
Figure 6:
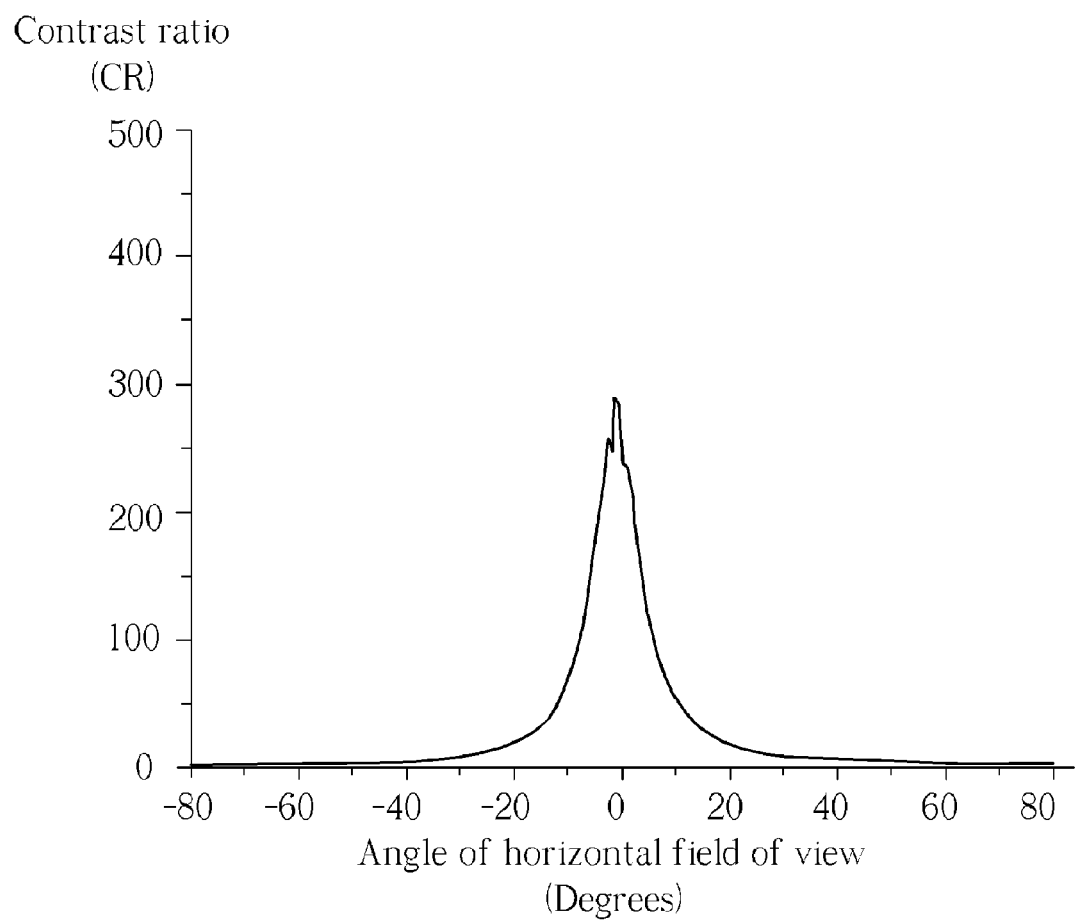
FIG. 6 and FIG. 7 are curve diagrams of the contrast ratio of the flat display device versus a horizontal field of view and a vertical field of view, respectively.
Figure 7:
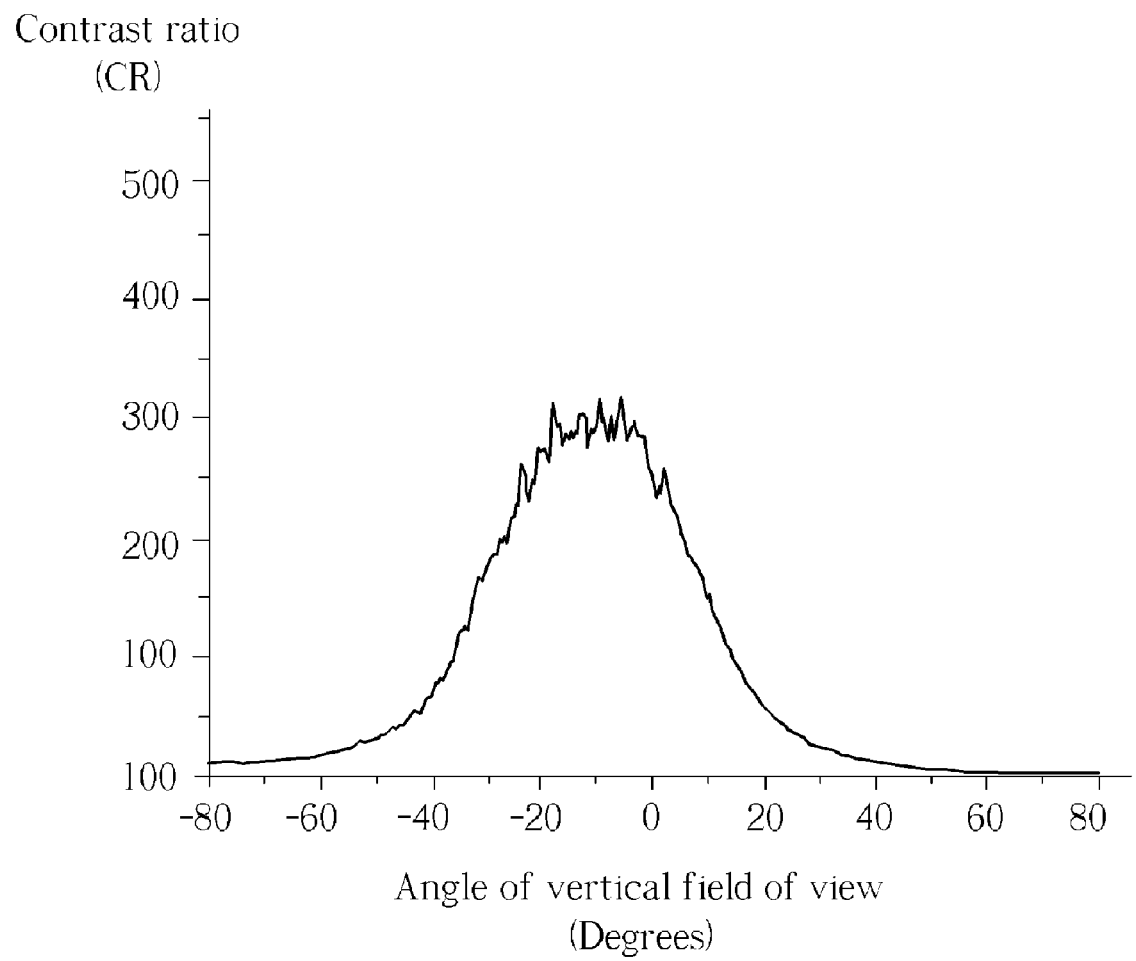

To offer a better understanding of the relationship between the contrast ratio and the view direction of the flat display device 10, please refer to FIG. 5 to FIG. 7. FIG. 5 is a contrast ratio contour of the flat display device 10 in the present invention, while FIG. 6 and FIG. 7 are, respectively, curve diagrams of the contrast ratio of the flat display device 10 versus horizontal field of view and curve diagrams of the contrast ratio of the flat display device 10 versus vertical field of view. As previously described, θ1/θ2, the absorption axes included angles of the upper and lower polarizing plate 14 and 16 of the flat display device 10 in the present invention are 15 degrees/105 degrees. It can be shown from FIG. 5 and FIG. 6 that the field of view in the left and right horizontal view directions of the flat display device 10 in the present invention is smaller in range while it can also be shown from FIG. 5 and FIG. 7 that the field of view in the vertical view direction of the flat display device 10 is larger. Further, the field of view in the lower vertical view direction is larger than that in the upper vertical view direction, offering the user a fine display image quality and field of view and moreover providing an anti-peeping function with regards to the upper view direction. In addition, the contrast ratio of the central field of view (0 degree) of the horizontal viewing angle of the flat display device 10 in the present invention can reach approximately 300, thus having a higher contrast ratio in comparison with common display products that lack a wide viewing angle design.

Figure 8:
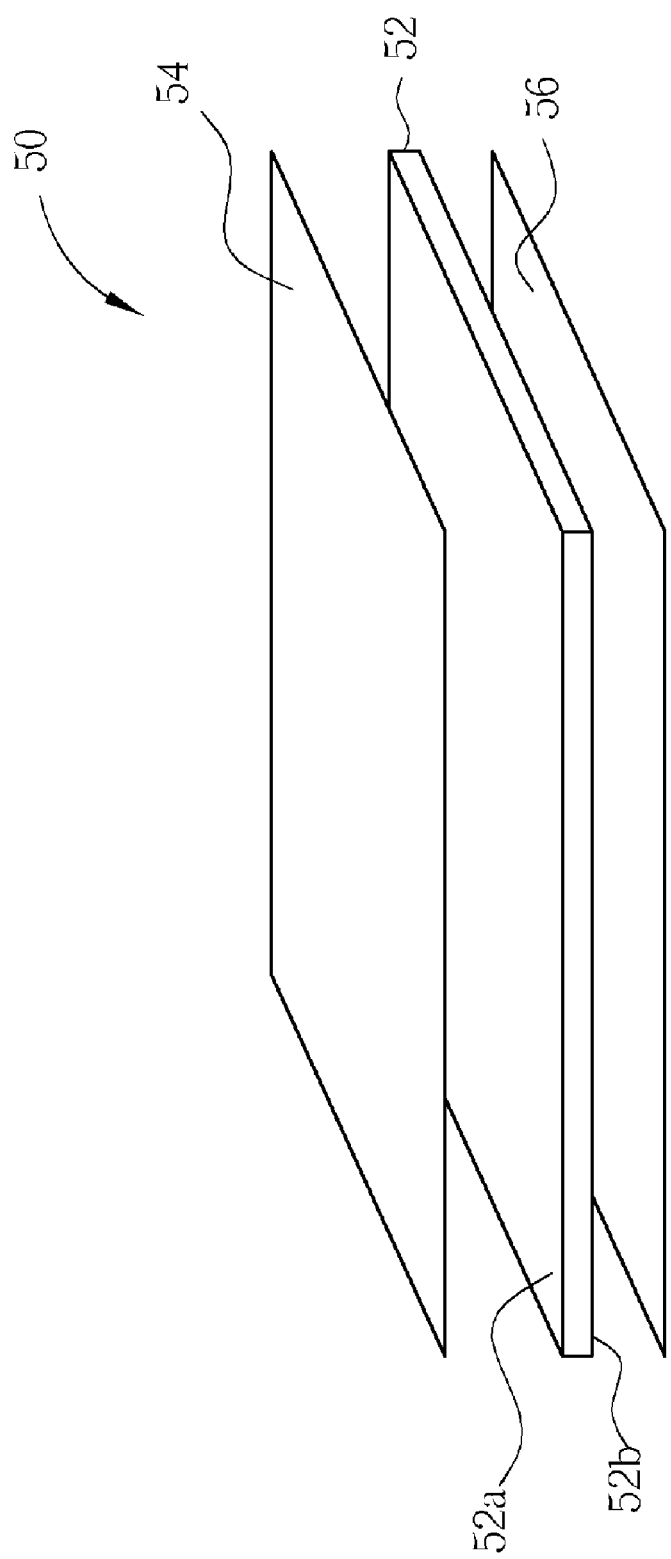
FIG. 8 is a schematic diagram of a flat display device according to a second embodiment of the present invention.

Please refer to FIG. 8. FIG. 8 is a schematic diagram of a flat display device 50 according to a second embodiment of the present invention. The flat display device 50 according to the present invention includes a flat display panel 52, an upper polarizing plate 54 and a lower polarizing plate 56. The flat display panel 52 includes a light exit plane 52a and a light entrance plane 52b. The upper polarizing plate 54 is disposed on the surface of the light exit plane 52a of the flat display panel 52, and the lower polarizing plate 56 is disposed on the surface of the light entrance plane 52b of the flat display panel 52. The upper polarizing plate 54 and the lower polarizing plate 56 includes Iodine-containing PVA film and two protection layers attached to both sides of the PVA film. The upper polarizing plate 54 includes no wide view materials; its structure is the same as the lower polarizing plate 16 in FIG. 3 of the previous embodiment. Contrarily, the lower polarizing plate 56 includes a WV film disposed on a side of its PVA film. For example, the protection layer of the lower polarizing plate 56 can be a WV TAC film; its structure is the same as the upper polarizing plate 14 in FIG. 2 of the previous embodiment. In a preferred embodiment, the WV film of the lower polarizing plate 56 can be an EWV film or an SWV film. Furthermore, the upper polarizing plate 54 and the lower polarizing plate 56 can selectively include a pressure-sensitive adhesive, a release film and a protection film (not shown) adhering to its surface.

Figure 9:
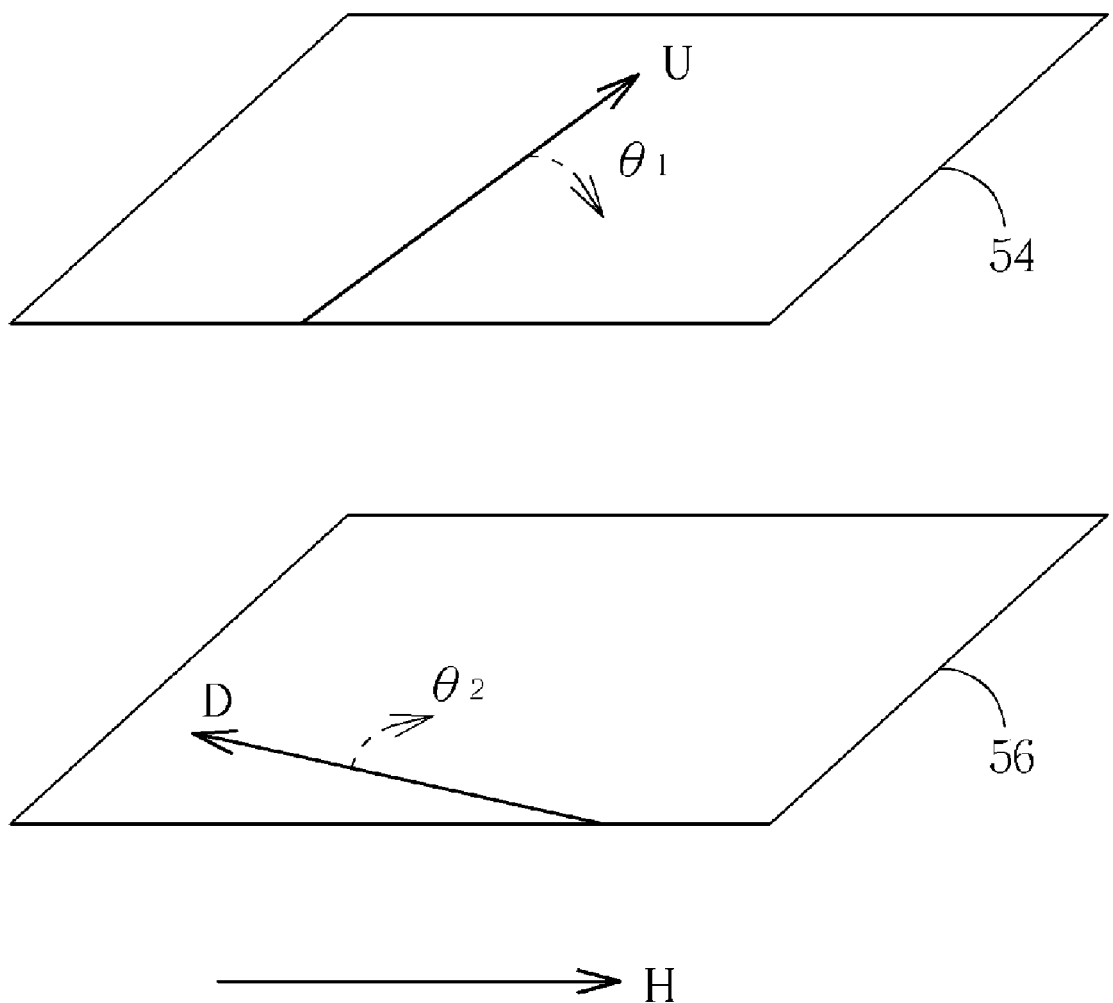
FIG. 9 is a schematic diagram of the relative relation regarding the absorption axes of the upper polarizing plate and the lower polarizing plate in the second embodiment according to the present invention.
Figure 10:
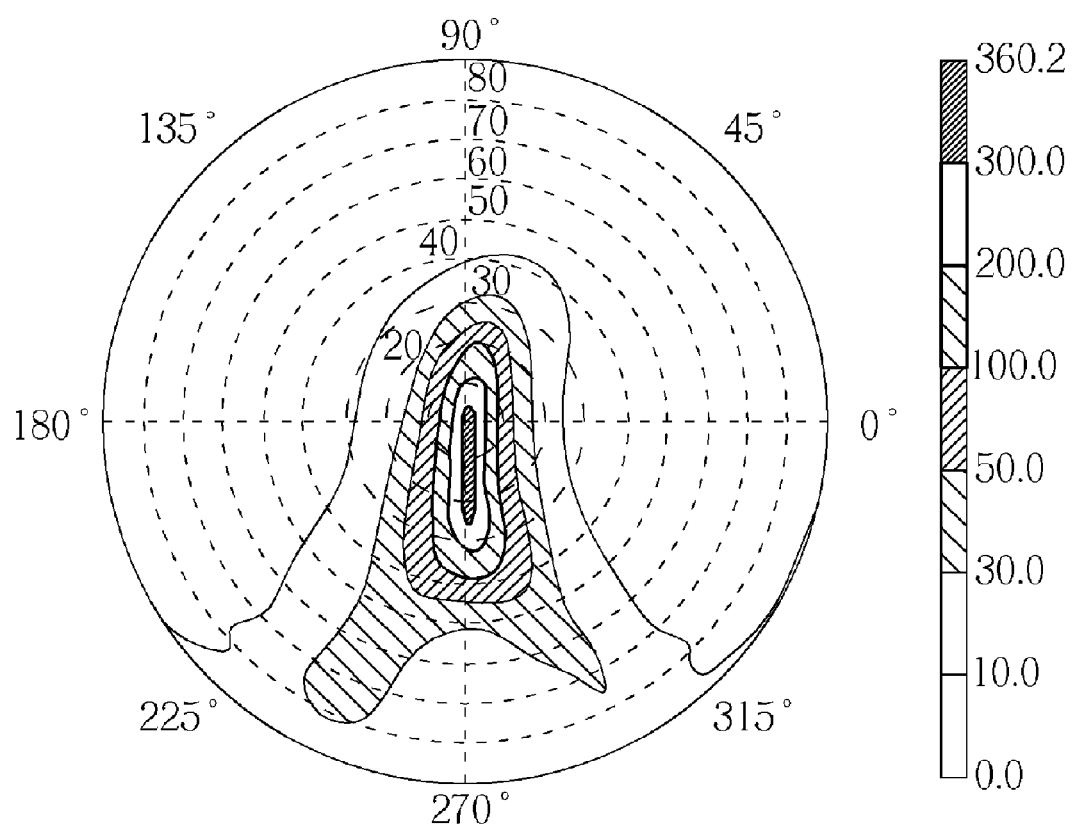
FIG. 10 is a contrast ratio contour of the flat display device in the second embodiment according to the present invention.

Please refer to FIG. 9. FIG. 9 is a schematic diagram of the relative relation regarding the absorption axes of the upper polarizing plate 54 and the lower polarizing plate 56 according to the second embodiment of the present invention. In the second embodiment of the present invention, the directions of the absorption axes of the upper polarizing plate 54 and the lower polarizing plate 56 are shown as arrow U and arrow D, respectively. Furthermore, included angles between the directions of the absorption axis U of the upper polarizing plate 54 and the absorption axis D of the lower polarizing plate 56 and the horizontal view direction (shown as H) of the flat display panel 52 are defined as θ1 and θ2, respectively. θ1 and θ2 are 75 degrees and 165 degrees, respectively. FIG. 10 is a contrast ratio contour of the flat display device 50 according to the second embodiment of the present invention. As shown in FIG. 10, the left and right horizontal view directions of the flat display device 50 in the present invention are both smaller than 30 degrees. The angle of field of view in the upper vertical view direction is approximately less than 40 degrees, while the angle of field of view in the lower vertical view direction is over 80 degrees.

In contrast with the prior art, WV film is disposed in the upper polarizing plate of the flat display device while the lower polarizing plate lacks films having wide view compensation characteristics, where included angles between the horizontal view direction and the absorption axes of the upper and lower polarizing plate 54, 56 are 15 degrees/105 degrees, respectively, in the present invention. In the second embodiment, the upper polarizing plate of the flat display device lacks films having wide view compensation characteristics while the WV film is disposed in the lower polarizing plate, where included angles between the horizontal view direction and the absorption axes of the upper and lower polarizing plate are 75 degrees/165 degrees, respectively. In sum, the angle of field of view in the left and right horizontal directions of the flat display device in the present invention can be limited to be less than 30 degrees when specific materials such as WV films are included and in collocation with different included angle combinations of the absorption axes of the polarizing plates. The angle of the field of view in the upper vertical view direction is decreased to be less than 40 degrees, while the angle of the field of view in the lower vertical view direction is over 80 degrees. In this way, an anti-peeping function is effectively offered. A larger field of view in the eye level direction and in the lower vertical view direction are also provided in comparison with a display device that lacks WV film in current technology. Thus, no polymer film as described in the prior art is needed in the flat display device of the present invention to provide the anti-peeping function when specific materials such as WV films are included and in collocation with different included angle combinations of the absorption axes of the polarizing plate, which can further decrease the cost and the thickness and size of the flat display device.

Those skilled in the art will readily observe that numerous modifications and alterations of the device and method may be made while retaining the teachings of the invention.

What is claimed is:

1. A flat display device, comprising:
   a flat display panel;
   an upper polarizing plate disposed on a light exit plane of the flat display panel, the upper polarizing plate comprising a wide view (WV) film, where an absorption axis of the upper polarizing plate and a horizontal view direction of the flat display panel has an included angle of 15 degrees; and
   a lower polarizing plate disposed on a light entrance plane of the flat display panel, where an absorption axis of the lower polarizing plate and the horizontal view direction of the flat display panel has an included angle of 105 degrees;
   wherein a left horizontal viewing angle of the flat display device is smaller than 30 degrees, a right horizontal viewing angle of the flat display device is smaller than 30 degrees, an upper vertical viewing angle of the flat display device is smaller than 40 degrees, and a lower vertical viewing angle of the flat display device is larger than 80 degrees.

2. The flat display device of claim 1, wherein the wide view film is an excellent wide view (EWV) film or a super wide view (SWV) film.

3. The flat display device of claim 1, wherein the upper polarizing plate and the lower polarizing plate individually comprise at least one triacetyl cellulose (TAC) film.

4. The flat display device of claim 3, wherein the upper polarizing plate or the lower polarizing plate further comprises a brightness enhancement film (BEF) in an outer side of the TAC film.

5. The flat display device of claim 1, wherein the wide view film of the upper polarizing plate is a WV TAC film.

6. The flat display device of claim 1, wherein the upper polarizing plate or the lower polarizing plate comprises a surface undergoing anti-glare treatment, series anti-glare treatment (SAG) or hard-coating treatment.

7. A flat display device, comprising:
   a flat display panel;
   an upper polarizing plate disposed on a light exit plane of the flat display panel, where an absorption axis of the upper polarizing plate and a horizontal view direction of the flat display panel has an included angle of 75 degrees; and
   a lower polarizing plate disposed on a light entrance plane of the flat display panel, the lower polarizing plate comprising a wide view (WV) film, where an absorption axis of the lower polarizing plate and the horizontal view direction of the flat display panel has an included angle of 165 degrees;
   wherein a left horizontal viewing angle of the flat display device is smaller than 30 degrees, a right horizontal viewing angle of the flat display device is smaller than 30 degrees, an upper vertical viewing angle of the flat display device is smaller than 40 degrees, and a lower vertical viewing angle of the flat display device is larger than 80 degrees.

8. The flat display device of claim 7, wherein the wide view film is an excellent wide view (EWV) film or a super wide view (SWV) film.

9. The flat display device of claim 7, wherein the upper polarizing plate and the lower polarizing plate individually comprises at least one triacetyl cellulose (TAC) film.

10. The flat display device of claim 9, wherein the upper polarizing plate or the lower polarizing plate further comprises a brightness enhancement film (BEF) in an outer side of the TAC film.

11. The flat display device of claim 7, wherein the wide view film of the lower polarizing plate is a WV TAC film.

12. The flat display device of claim 7, wherein the upper polarizing plate or the lower polarizing plate comprises a surface undergoing anti-glare treatment, series anti-glare treatment or hard-coating treatment.

* * * * *